(12) United States Patent
Pastrana

(10) Patent No.: US 10,949,855 B2
(45) Date of Patent: Mar. 16, 2021

(54) MATHEMATICAL CONSTANT PI DYNAMIC-HYBRID CVV AUTHENTICATION METHOD FOR CREDIT CARDS

(71) Applicant: Joseph Carlo Pastrana, Hampton, VA (US)

(72) Inventor: Joseph Carlo Pastrana, Hampton, VA (US)

( * ) Notice: Subject to any disclaimer, the term of this patent is extended or adjusted under 35 U.S.C. 154(b) by 0 days.

(21) Appl. No.: 16/741,996

(22) Filed: Jan. 14, 2020

(65) Prior Publication Data

US 2020/0151730 A1    May 14, 2020

(51) Int. Cl.
G06Q 40/00    (2012.01)
G06Q 20/40    (2012.01)
G06Q 20/34    (2012.01)

(52) U.S. Cl.
CPC ......... G06Q 20/4018 (2013.01); G06Q 20/34 (2013.01)

(58) Field of Classification Search
CPC ........................... G06Q 20/4018; G06Q 20/34
See application file for complete search history.

(56) References Cited

U.S. PATENT DOCUMENTS

| | | | |
|---|---|---|---|
| 7,427,033 B1 * | 9/2008 | Roskind | G06F 21/34 235/380 |
| 10,078,840 B2 * | 9/2018 | Powell | G06Q 20/3821 |
| 10,375,120 B2 * | 8/2019 | Baumgart | G06N 20/10 |
| 2010/0293093 A1 * | 11/2010 | Karpenko | G06Q 20/40 705/41 |
| 2012/0018506 A1 * | 1/2012 | Hammad | G06Q 30/06 235/375 |

(Continued)

FOREIGN PATENT DOCUMENTS

| | | | | |
|---|---|---|---|---|
| EP | 3168803 A1 * | 5/2017 | ......... | G06Q 20/3829 |
| WO | WO-2015126753 A1 * | 8/2015 | ........... | G06Q 20/363 |
| WO | WO-2018112525 A1 * | 6/2018 | ............. | G06Q 20/18 |

OTHER PUBLICATIONS

Ms. Smith, "Can credit cards with CVVs that automatically change every hour kill off card fraud?," Privacy and Security Fanatic, News (Year: 2016).*

(Continued)

*Primary Examiner* — Alexander G Kalinowski
*Assistant Examiner* — William B. Bunker

(57) ABSTRACT

A computer-implemented method for authenticating credit cards via a mathematical operation of the mathematical constant Pi. Pi is stored in a user-operated computing device connected to a network, wherein an application software performs the said mathematical operation of Pi to select a segment of Pi. The selected Pi segment becomes the Dynamic Card Verification Value (DCVV) of a credit card. The method is dynamic, creating a new DCVV for the user's credit card each time the user operates his/her computer device to purchase products and services online with his/her credit card. To attain the same Pi segment, the issuer of the credit card utilizes in its computer server the same parameters and mathematical operation that the user utilizes on his/her computing device. Consequently, this process provides the user and issuer with a synchronized process to attain the same resulting DCVV to authenticate a credit card.

9 Claims, 3 Drawing Sheets

(56) References Cited

U.S. PATENT DOCUMENTS

| | | | | |
|---|---|---|---|---|
| 2012/0153028 A1* | 6/2012 | Poznansky | ............... | G07F 7/122 |
| | | | | 235/492 |
| 2013/0008956 A1* | 1/2013 | Ashfield | ................ | G06Q 20/24 |
| | | | | 235/380 |
| 2013/0124292 A1* | 5/2013 | Juthani | ................. | H04L 63/083 |
| | | | | 705/14.26 |
| 2015/0120571 A1* | 4/2015 | Sanchez | ............. | G06Q 20/4012 |
| | | | | 705/72 |
| 2016/0027017 A1* | 1/2016 | Chitragar | ............. | G06Q 20/202 |
| | | | | 705/71 |
| 2016/0247141 A1* | 8/2016 | Graylin | ............ | G06Q 20/40145 |
| 2016/0275513 A1* | 9/2016 | Kumar | ................... | G06Q 20/36 |
| 2018/0373861 A1* | 12/2018 | Pastrana | ................ | G06F 21/40 |
| 2019/0303915 A1* | 10/2019 | Hammad | ................ | G06F 21/34 |
| 2019/0354985 A1* | 11/2019 | Edwards | ............ | G06Q 20/4018 |

OTHER PUBLICATIONS

Barri Segal, "Will dynamic CVVs become the ultimate in credit card security?" Creditcards.com/credit-card-news, (Year: 2017).*

Anonymous, "Understanding and Selecting a Tokenization Solution," Securosis, (Year: 2018).*

Blog, "Is pi a good random number generator?" Mathoverflow, mathoverflow.com/net/questions (Year: 2010).*

\* cited by examiner

US 10,949,855 B2

MATHEMATICAL CONSTANT PI DYNAMIC-HYBRID CVV AUTHENTICATION METHOD FOR CREDIT CARDS

CROSS-REFERENCE TO RELATED APPLICATIONS

Not applicable to this application

Federally Sponsored Research or Development

Not applicable to this application

Sequence Listing, a Table, or a Computer Program Listing

Not applicable to this application

Compact Disc Appendix

Not applicable to this application

Statement Regarding Prior Disclosures by the Inventor

Not applicable to this application

BACKGROUND OF THE INVENTION

The technical field of the invention relates to the security of information found integrated (printed) on credit cards. More particularly, the present invention relates to the field of protecting the Card Verification Value (CVV) information currently displayed on credit cards. When a person obtains a credit card with sensitive personal data from a bank, a person is constantly trying to safeguard his/her personal information, whether at home, at work, or in some other location. The effort is endless and always required. As an example, to verify the legitimacy of a credit card during an online purchase, banks are providing credit cards with a static (fixed) Card Verification Value (CVV) to protect their customers' credit card online transactions. Thus, because of the importance of the CVV, a person is constantly trying to safeguard this information.

However, the CVV, account numbers as well as other information are still displayed on credit cards and as a result, the possibility of the said information being obtained illegitimately by unauthorized users. Thus, the abovementioned method (CVV printed on credit cards) still is unable to avoid illegitimate credit card transactions. This is particularly detrimental to the credit card industry as it still facing credit card fraud activities where unauthorized persons are still obtaining cardholders' credit card numbers and their Card Verification Values (CVVs) to illicitly purchase products and/or services. Accordingly, improved methods to protect the credit card's CVV information and credit card online transactions remain highly desirable.

BRIEF SUMMARY OF THE INVENTION

A computer-implemented method to calculate and generate a Dynamic Card Verification Value (DCVV) for a credit card and authenticate the said credit card via a computer-run mathematical operation (a calculation by mathematical methods) of the mathematical constant Pi ($\pi$) to arrive at a segment of said Pi, wherein the segment of Pi becomes the Dynamic Card Verification Value (DCVV) of a credit card. The method is dynamic, creating a new DCVV for a user's credit card each time the user operates his/her computer device to make an online transaction (e.g. purchasing products and/or services) with his/her credit card. The said computer device (also referred as computing device) includes such computer devices as laptops, tablets, iPads, or cellular telephones. The computer device utilized by the credit card user (cardholder) is connected to a network, wherein a computer server, operated by the credit card issuer, is also connected to the network. The method is coded and operated by a computer application program designed to operate the said computer-implemented method. To authenticate a credit card, the issuer of the credit card utilizes in its computer server the same parameters and mathematical operation that the credit card user utilizes on his/her computing device. By sharing the same parameters, the user and the credit card issuer are capable to attain the same Pi Segment (PS) and thus, the same DCVV. The authentication of the DCVV occurs when the user is performing an online purchasing transaction, where the online Vendor sends the credit card account and DCVV information to the Issuer for approval or when the user is making a payment to the credit card issuer. Accordingly, the method provides the credit card issuer with a user-driven synchronized process to verify the user's credit card during online transactions.

Furthermore, when combining the computer-implemented method for authenticating credit cards with frequently changing card verification values via mathematical constant Pi ($\pi$) with the currently used static non-changing CVV, the invention allows a credit card to become a hybrid credit card with a dual card verification value system. To transform a credit card into a hybrid credit card, the credit card is programmed to utilize the fixed CVV when an online purchasing transaction is under a predetermined transaction value and wherein the DCVV is programmed to be utilized by the user when an online purchasing transaction is above a predetermined transaction value.

BRIEF DESCRIPTION OF THE SEVERAL VIEWS OF THE DRAWINGS

The following figures are included to illustrate certain aspects of the invention, and should not be viewed as exclusive embodiments. The subject matter disclosed is capable of considerable modification, alteration, and equivalents in form and function, as will occur to one having ordinary skill in the art and the benefit of this disclosure.

DETAILED DESCRIPTION OF THE INVENTION

The following description of the embodiment of the invention is not intended to limit the invention to this mentioned embodiment, but rather to enable any person skilled in the art to make and use this invention. The embodiment of the invention includes, but is not limited, to a computer-implemented method to calculate and generate a Dynamic Card Verification Value (DCVV) for a credit card and authenticate the said credit card via a computer-run mathematical operation (a calculation by mathematical methods) of the mathematical constant Pi (π) to arrive at a segment of said Pi, wherein the calculated Pi Segment (PS) becomes the DCVV of a credit card and wherein the DCVV represents a segment of the user-prearranged Pi Range. The DCVV is acquired by the said mathematical operation of Pi each time a cardholder utilizes an application software designed to calculate a new DCVV for his/her credit card. The said application software operates on the user's computing device. The subject matter disclosed is capable of considerable modification, alteration, and equivalents in form and function, as will occur to one having ordinary skill in the art and the benefit of this disclosure and it is to be accorded the widest scope consistent with the principles and features disclosed herein.

For simplicity purposes, in this patent application, the term "user" is used to define a credit card cardholder (hence, a user is a person possessing and utilizing a credit card). The term "issuer" is used to define a bank or a business organization issuing credit cards to their customers (the cardholders).

The term "Pi Range" represents a user's selected sequential array of decimal digits representing a subdivision of the mathematical constant Pi to be utilized by the said computer-implemented method (the invention). The extent of the Pi Range is defined and limited by the user. For example, the user can select a sequential array of 100,000 decimal digits within Pi to comprise the Pi Range utilized by his/her computer device to calculate the Dynamic Card Verification Value (DCVV). The user's created Pi Range is also provided to the credit card issuer as the issuer's computer server necessitates it to calculate the Dynamic Card Verification Value (DCVV). Moreover, the user selects any point (digit) within the mathematical constant Pi as the beginning of the Pi Range. For example, the user can define his/her Pi Range as the range that begins with the thirteen decimal digit of Pi. Thus, the numeral "7" in the 3.1412956535897932 array of decimal digits of Pi is the first digit in his/her assigned 100,000 decimal digits Pi Range.

Figure 3:
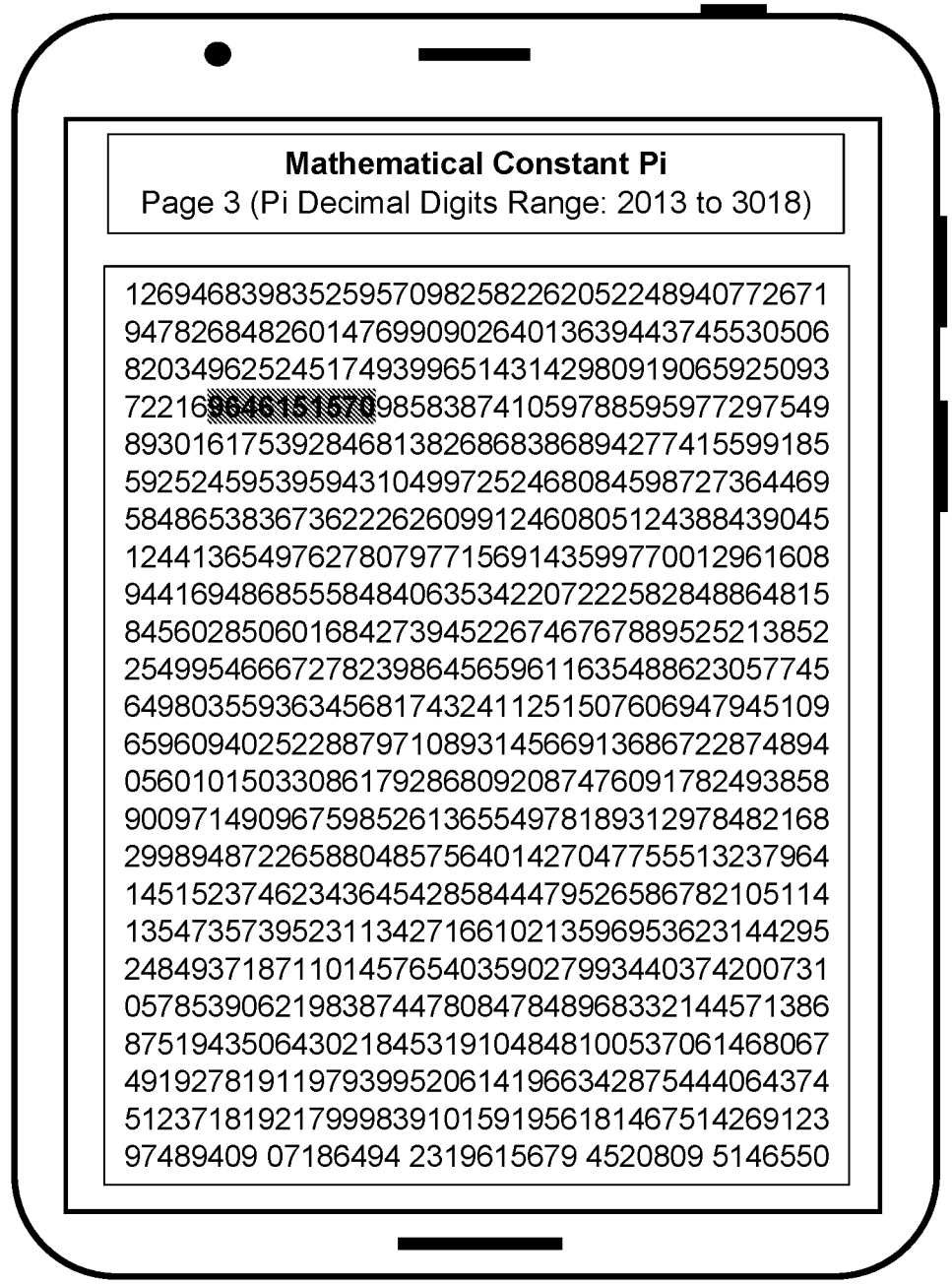
FIG. 3 (Sheet 3 of 3) depicts a cell phone's screen displaying a section of the Pi Range (page 3) starting on the 2,013 tenths decimal digit and ending on the 3,018 tenths decimal digit. The highlighted Pi Segment (PS) "9646151570" represents the latest calculated Dynamic Card Verification Value (DCVV) assigned to the user's credit card.

The term "Pi Segment" (PS) represents a sector within the Pi Range. The Pi Range (PR) is comprised of Pi segments. The Pi segment (PS) calculated by the said computer-implemented method (see highlighted segment in FIG. 3) becomes the latest DCVV assigned to the user's credit card. The user determines the length of the Pi Segment (the number of digits comprising the PS). For example, one user can arrange Pi Segments to be comprised of 3 decimal digits while another user will assign 6 decimal digits to the Pi Segments. Accordingly, the term Pi Segment Length (PSL) refers to the number of digits comprising the Pi Segment.

The method also comprises of Pi User Identifiable Parameters (PUIPs) which are linked to the user's Personal Identifiable Information (PII) and his/her credit card account information. The PUIPs includes a Pi Range (PR), a Pi Segment Length (PSL), a Pi Starting Segment (PSS), a Pi Change Rate (PCR), a Decimal Repositioning Movement (DRM), and a Current Time (CT).

The PR is selected by the user and agreed upon by both, the user and the credit card issuer. As an example of a PR, the first 100,000 decimal places of Pi can constitute the PR agreed upon by the user and the credit card issuer. Thus, the first ten decimal digits of the PR are "1412956535" and the PR will continue for another 99,990 decimal digits.

Figure 1:
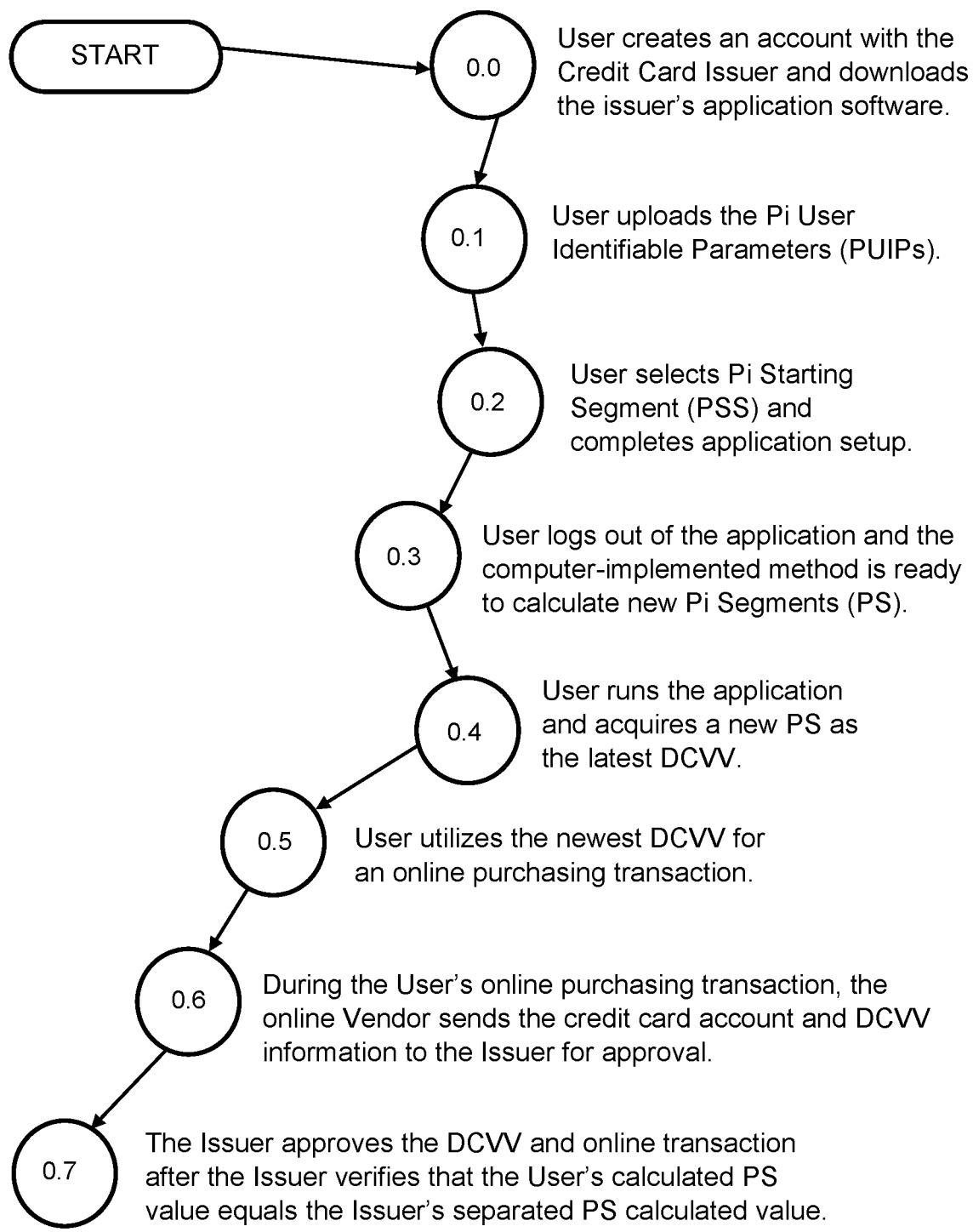
FIG. 1 (Sheet 1 of 3) is a sequence diagram illustrating an operation sequence according to the user interface with his/her computer device as the user creates the Pi User Identifiable Parameters (PUIPs) and proceeds to acquire a new Pi Segment (PS) as the latest DCVV to be assigned to his/her credit card.
Figure 2:
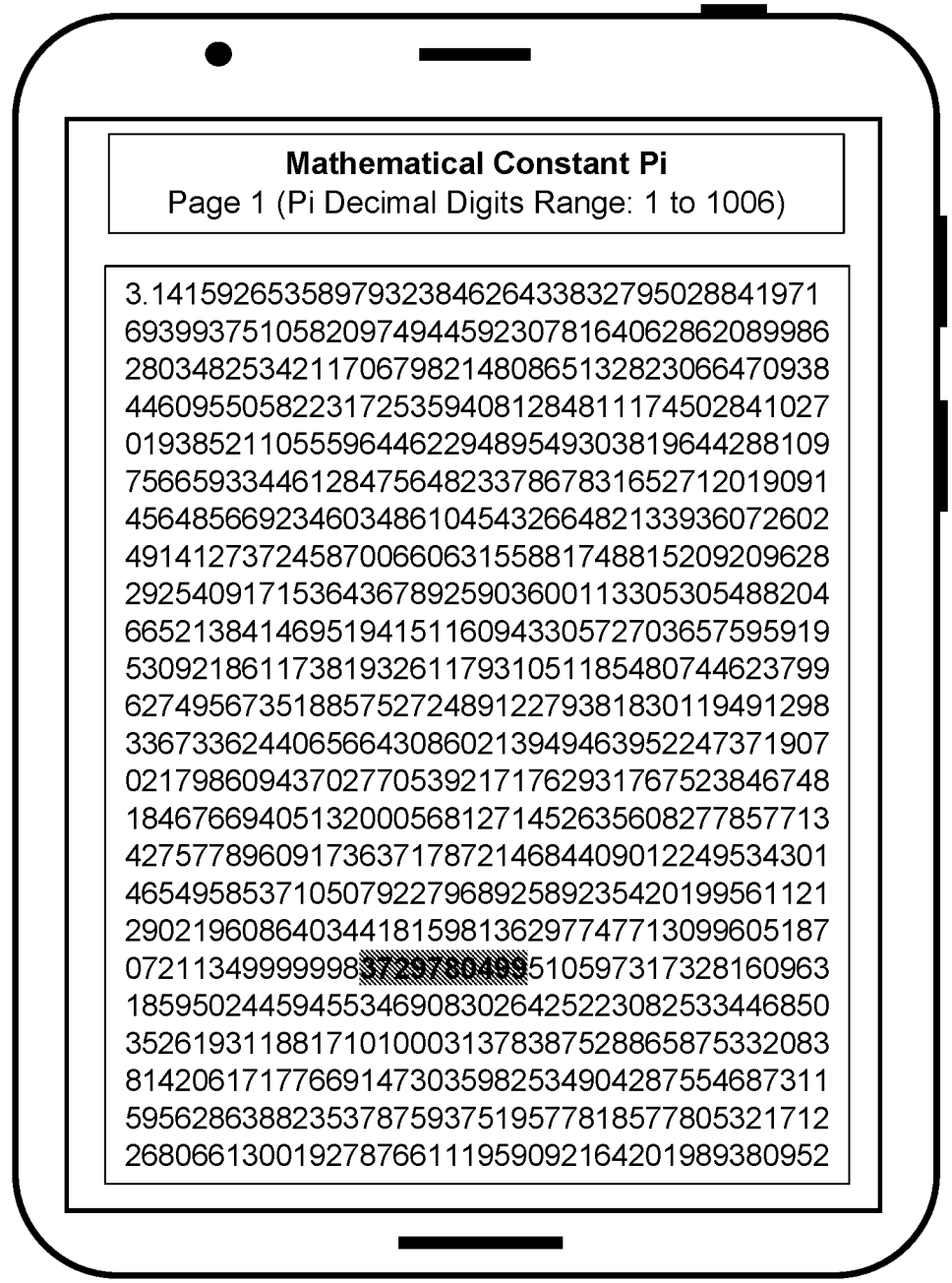
FIG. 2 (Sheet 2 of 3) depicts a cell phone's screen displaying the first 1,006 decimal digits of the Pi number and the highlighted Pi Segment "3729780499". As part of the user's parameters set up, the user must select his/her first Pi Segment as his/her Pi Starting Segment (PSS). Accordingly, the highlighted segment of Pi in FIG. 2 represents the PSS selected by the user. The highlighted Pi Segment "3729780499" is located in Page 1 (displayed by the cell phone's screen) of the numbered pages representing the Pi Range selected by the user (the number of pages created and displayed by the computing device will depend on the extent of the PR and the number (quantity) of decimal digits displayed per page).

The PSS refers to a segment of the PR selected by the user as the starting point of reference to calculate the PS representing the DCVV (see highlighted segment in FIG. 2). When the user selects the PSS, the method utilizes the time when the PSS is selected by the user to start (initiate) the clock. Accordingly, the time at the selection of the PSS in combination with the PCR, are used to calculate the first PS. From the first PS clocked time, the next PS is calculated utilizing the PCR and in combination with the prior PS clocked time. Accordingly, all Pi segments are calculated utilizing the clocked time of the expiring PS and the PCR to acquire the next PS. As a result of the PCR, all DCVV are activated for the duration of the PCR (hence, for a limited period of time). Accordingly, after the PCR time period concludes, the current PS is replaced by a new and active PS.

The PCR sets the time period that the DRM takes to move from one PS location to another PS location within the PR. For example, when a PCR equals 95 minutes, the PCR instructs the mathematical operation of the computer-implemented method to provide the next PS in 95 minutes. Accordingly, the user's credit card acquires a new DCVV every 95 minutes (the DCVV is the equivalent of the latest calculated PS).

The DRM represents the number of decimal digits between the expired PS and the latest calculated PS. The mathematical operation of the computer-implemented method finds the location of the new PS (within the PR) by moving from the expiring PS location a prearranged number of decimal digits (the DRM). For example, the location of a new PS is calculated by moving away 2,256 decimal digits from the location of the expiring PS. Accordingly, the PS changes values as the method's mathematical operation utilizes the DRM to calculate the latest DCVV.

The Current Time (CT) is associated with the User's Computer Device and the Credit Card Issuer and synchronized from at least one of the following: a timer, a centralized time system, a network time, or a cell phone network system time.

The said computer device is also referred in this patent application as computing device and includes such computer devices as laptops, tablets, iPads, or cellular telephones. The computing device is utilized and operated by the user (the cardholder) to acquire Dynamic Card Verification Values for his/her credit card. The computer server refers to the computer operated by the credit card issuer to acquire, through the same mathematical operation and PUIPs utilized by the user, the same Dynamic Card Verification Values to authenticate the cardholder's credit card during an online credit card transaction (e.g. purchasing transaction). Therefore, the computer server and the computing device are capable to obtain the same result, thus the same PS. Further, the user's computing device, the credit card issuer's computer server and the online vendors' computer systems are all connected to the same network. Therefore, the connection to the network by the credit card issuer's computer server provides the credit card issuer with the necessary electronic communication to authenticate the user's DCVV and authorize the use of the user's credit card during an online credit card transaction. As an example, the authentication of the DCVV is performed when the user is making an online purchasing transaction, where the online Vendor sends the credit card account and DCVV information (provided by the user) to the Issuer for approval, or when the user is making an online payment to the credit card issuer. Accordingly, the method provides the credit card issuer with a user-driven synchronized process to verify the user's credit card during online transactions.

Once the abovementioned parameters are established and agreed by the user and issuer, the computer-run mathematical operation (a calculation by mathematical methods) of the mathematical constant Pi ($\pi$) and the PUIPs are utilized to calculate a new segment of Pi, hence the latest DCVV assigned to the user's credit card.

As part of the invention's method, the user-selected range of the mathematical constant Pi (3.141592 . . . ) is stored in the electronic memory of the user-operated computing device and the database of the issuer's computer server. Since Pi is an infinite number, only a range of Pi demarcated by the user is stored by the user into his/her computer device as the Pi Range. The same Pi Range selected (prearranged) by the user is stored in the database of the credit card issuer's computer server.

The computer-implemented method is operated by an application software (operating in the user's device) to perform the computer-run mathematical operation on the Pi Range to select a segment of Pi. When the user operates the computer-implemented method, the application software, run by the user's computing device, provides the user the latest Pi Segment. The computing device provides the user with the latest DCVV through the computer device's screen. The newly acquired DCVV is then utilized by the user to perform an online credit card transaction with said new DCVV. Furthermore, to support the functioning of the network-based DCVV authentication process, a computer software is also designed to operate in the Issuer's computer server and consequently, to support the computer-implemented method to authenticate the DCVV of credit cards.

The computer-implemented method for authenticating credit cards can be utilized to create a hybrid authentication method for credit cards. The method of the invention provides a credit card to be used as a "Hybrid Credit Card" by creating a dual card verification value system for the said hybrid credit card. A hybrid credit card keeps its current static non-changing Card Verification Value (CVV) system (the CVV printed on the credit card) while also having the Dynamic Card Verification Value (DCVV) system. For example, a hybrid credit card with the dual verification value system (CVV and DCVV) can be used to make online purchasing transactions that are under a predetermined transaction value (e.g. under $200.00) with the CVV while utilizing a DCVV when performing an online purchasing transaction that is above a predetermined transaction value (e.g. equal or over $200.00). Accordingly, the hybrid credit card provides the convenience of a CVV for low value transactions while providing a new DCVV as an additional protection to the user when he/she is making online purchase transactions that are over $200.00.

SEQUENCE LISTING

Not Applicable

I claim:

1. A user-driven computer-implemented method for authenticating credit cards with frequently changing card verification values via mathematical constant Pi ($\pi$), comprising of:

operating, by a user, a user-operated computing device connected to a network to perform a credit card transaction (e.g. an online an purchasing transaction with an online vendor), wherein the user is the holder of the credit card which is issued to the user by a credit card issuer, wherein an issuer's computer server and a vendor's computing device are also connected to the network such that the user, the vendor and the issuer are in electronic communication with one another;

storing, by the user on the user-operated computing device, a user Personal Identifiable Information (PII), the mathematical constant Pi and a set of user-created Pi User Identifiable Parameters (PUIPs) into the memory of the user-operated computing device, wherein the PUIP's are changeable by the user at any time but not by the issuer or the vendor; wherein the PUIPs include at least a Pi Range (PR), a Pi Segment Length (PSL), a Pi Starting Segment (PSS), a Pi Change Rate (PCR), a Decimal Repositioning Movement (DRM), and a Current Time (CT);

downloading from the issuer computer server an application software and installing the application on the user-operated computing device, wherein the application software is designed to perform a mathematical operation of the mathematical constant Pi, wherein the computing device comprises a user display for viewing a screen illustrating the results of the mathematical operation;

operating, via the application on the user-operated computing device, in response to initiating an online purchasing transaction with the vendor, the mathematical operation by utilizing the mathematical constant Pi and the set of user-created PUIPs to select a new segment of Pi, wherein the new segment of Pi comprises the DCVV used to authenticate the user's credit card for that transaction;

displaying, in response to operating the application, on the user-operated computing device, a screen which illustrates the user-selected Pi range (PR), the highlighted Pi segment, and the expiration time of the Pi segment (DCVV);

synchronizing, by the user-operated computing device, the segment of Pi to the user's credit card account information, wherein the latest segment of Pi becomes the latest Dynamic Card Verification Value (DCVV) of the user's credit card;

storing, by the credit card issuer's computer server, into the memory of the issuer's computer server, the user Personal Identifiable Information (PII), the mathematical constant Pi, the same user-created PUIPs, and the mathematical operation that the user utilizes on his/her computing device;

receiving, from the vendor computing device, by the issuer server computer, a request to authenticate the user's credit card associated with the online purchasing transaction, wherein the request includes the latest DCVV provided by the user;

operating, in response to the request, an issuer computer server application software installed on the issuer server designed to perform the mathematical operation of the mathematical constant Pi and the set of user-created PUIPs each time the credit card's DCVV is utilized by the user to complete a credit card transaction;

synchronizing, in response to the request, by the issuer computer server, a newly acquired segment of Pi to the user's credit card account, wherein the newly acquired segment of Pi becomes the latest Dynamic Card Verification Value (DCVV);

comparing, in response to the request, by the user computer device, the resulting DCVV obtained in the request and the resulting DCVV acquired by the issuer's computer server to authenticate the user's credit card; and approving the transaction if the compared DCVV values match, but denying the transaction is they do not match.

2. The computer-implemented method for authenticating credit cards via mathematical constant Pi of claim 1, wherein the stored set of user-created Pi User Identifiable Parameters (PUIPs) further comprises: selecting a first segment of mathematical constant Pi as a Pi Starting Segment (PSS) value.

3. The computer-implemented method for authenticating credit cards via mathematical constant Pi of claim 1, wherein the stored set of user-created Pi User Identifiable Parameters (PUIPs) further comprises: establishing a Pi Change Rate (PCR) that defines the time frequency the Pi segment is substituted.

4. The computer-implemented method for authenticating credit cards via mathematical constant Pi of claim 1, wherein the stored set of user-created Pi User Identifiable Parameters (PUIPs) further comprises: establishing a Decimal Repositioning Movement (DRM) that defines how many decimal digits the new Pi segment moves within the mathematical constant Pi to substitute the prior selected Pi segment.

5. The computer-implemented method for authenticating credit cards via mathematical constant Pi of claim 1, wherein the mathematical operation further comprises: performing the mathematical operation of the mathematical constant Pi and the set of user-created PUIPs each time the user initiates the application software to acquire a new DCVV to complete an online credit card transaction.

6. The computer-implemented method for authenticating credit cards via mathematical constant Pi of claim 1, wherein to attain the same Pi segment, the issuer of the credit card utilizes in its computer server the same Pi User Identifiable Parameters (PUIPs) and mathematical operation that the user-operated computing device utilizes to select the Pi segment, synchronizing the process for both, user and issuer, to continuously attain the same DCVV to authenticate the user's credit card.

7. The computer-implemented method for authenticating credit cards via mathematical constant Pi of claim 1, wherein the application software is executed by the computing device to operate the instructions of the mathematical operation to obtain a new segment of Pi to represent the latest DCVV assigned to the user's credit card.

8. The computer-implemented method for authenticating credit cards via mathematical constant Pi of claim 1, wherein the mathematical operation of said mathematical constant Pi utilizes a Pi Change Rate (PCR), a Decimal Repositioning Movement (DRM), a Pi Verification Digit (PVD), and Current Time (CT) to obtain a new segment of Pi to represent the latest DCVV assigned to the user's credit card.

9. The computer-implemented method for authenticating credit cards via mathematical constant Pi of claim 1, wherein the credit card is a hybrid credit card with a dual card verification value system, programmed to utilize the fixed CVV for point of sale transactions or when an online credit card transaction is under a predetermined transaction value; and wherein the DVCC is programmed to be utilized by the user when an online credit card transaction (e.g. purchasing transaction) is above a predetermined transaction value.

\* \* \* \* \*